United States Patent
Ohzeki et al.

(10) Patent No.: US 8,125,729 B2
(45) Date of Patent: Feb. 28, 2012

(54) DISK DRIVE AND ERROR-RECOVERY PROCESSING METHOD

(75) Inventors: Hideki Ohzeki, Kanagawa (JP);
Kazuyuki Ishibashi, Kanagawa (JP);
Yoshikatsu Fujii, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/790,648

(22) Filed: May 28, 2010

(65) Prior Publication Data
US 2010/0328813 A1    Dec. 30, 2010

(30) Foreign Application Priority Data
May 29, 2009 (JP) .................... 2009-130855

(51) Int. Cl.
*G11B 5/596* (2006.01)

(52) U.S. Cl. .................... 360/78.08; 360/78.04
(58) Field of Classification Search .................. None
See application file for complete search history.

(56) References Cited

U.S. PATENT DOCUMENTS

| | | | | |
|---|---|---|---|---|
| 6,927,935 B2 * | 8/2005 | Yano | ............. | 360/78.07 |
| 7,113,363 B2 * | 9/2006 | Saito | ............. | 360/78.04 |
| 2006/0203375 A1 | 9/2006 | Fujii et al. | | |

* cited by examiner

*Primary Examiner* — Andrew L Sniezek

(57) ABSTRACT

A disk drive. The disk drive includes a head, a motion mechanism, and a controller. The head is configured to access a disk configured to store data. The motion mechanism is configured to move the head. The controller is configured to determine a seek direction when an error occurred; and, the controller is configured to repeat a seek as a repeat seek to a target radial position from a direction opposite to the seek direction in an error-recovery process for the error which occurred in the seek in which the head moved to the target radial position.

16 Claims, 8 Drawing Sheets

DISK DRIVE AND ERROR-RECOVERY PROCESSING METHOD

CROSS-REFERENCE TO RELATED APPLICATION

This application claims priority from the Japanese Patent Application No. 2009-130855, filed May 29, 2009 the disclosure of which is incorporated herein in its entirety by reference.

TECHNICAL FIELD

Embodiments of the present invention relate to a disk drive and an error-recovery processing method, in particular, to a seek error-recovery process.

BACKGROUND

A disk drive is known as a device which uses various types of media such as optical disks, magneto-optical disks, or flexible magnetic-recording disks. Of these types of disk drives, a hard-disk drive (HDD) is used not only in computers, but in many electronic devices such as video recording and playback devices and car navigation systems.

A magnetic-recording disk used in a HDD includes a plurality of data tracks and a plurality of servo tracks formed in concentric circular shapes. Each servo track is constructed from a plurality of servo sectors containing address information. In addition, each data track is constructed from a plurality of data sectors containing user data. The data sectors are recorded in the circumferential direction between the servo sectors, which are separated. A head-slider supported by an oscillating actuator can write data to a data sector, and read out data from a data sector, by accessing a designated data sector in accordance with address information in the servo sector.

The HDD reads data from a target address, or writes data to, a target address by following the commands from a host. Before a data read or data write, the HDD controls the oscillating actuator, and moves the head-slider to the target data track. Thus, a process for moving the head-slider from the current data track, which is located at one radial position, to the target data track which is located at another radial position, is referred to as a seek process.

If an error is generated in a read process or a write process, the HDD starts an error-recovery process for handling the error. The HDD includes an error-recovery process table which is set and stored in advance. The error-recovery process table is constructed from a plurality of error-recovery processing operations. The HDD sequentially executes, from the highest priority operation, the error-recovery processing operations stored in the error-recovery process table. If the error is recovered in any of the operations, the HDD resumes normal operation.

The errors generated in the HDD processing and the effective error-recovery processing operations for an error differ depending on the processing mode in which the error was generated. Consequently, the HDD includes a plurality of error-recovery process tables corresponding to a plurality of processing modes. For example, the HDD includes a seek error-recovery process table, a read error-recovery process table, and a write error-recovery process table.

When a read command or a write command is received from the host, the HDD starts the seek process from the data track currently being followed and moves the head-slider to the target data track. When the head-slider is able to follow the target track, the seek process ends. If an error is generated in this seek process, the HDD refers to the seek error-recovery process table, and sequentially executes each operation until the error is recovered.

If an error is generated in a data read or a data write in the target track after completion of the seek, the HDD refers to the read error-recovery process table or the write error-recovery process table, and sequentially executes each operation in the table until the error is recovered, which is until the data read or write ends normally.

One error during the seek process, which is known in the art, is caused by a defect in the magnetic-recording disk. When the head-slider passes over the defect, the HDD cannot correctly read the servo data, and the seek process is suspended. For example, when the specified number of servo data sectors cannot be read correctly, a seek error is generated.

This type of seek error indicates that there is a region having a poor recording state for servo data on the recording surface. For example, a write failure in a servo data write or a defective region on the recording surface spreads over time, and a defective region is formed in the servo data as described above. Since a large number of defective servo sectors exists in the servo track, a data track which cannot be correctly followed cannot be used in a data write. This type of data track is not a target for the seek process, and the head-slider passes over that track to seek in another data track. This is the cause of a seek error.

SUMMARY

Embodiments of the present invention include a disk drive. The disk drive includes a head, a motion mechanism, and a controller. The head is configured to access a disk configured to store data. The motion mechanism is configured to move the head. The controller is configured to determine a seek direction when an error occurred; and, the controller is configured to repeat a seek as a repeat seek to a target radial position from a direction opposite to the seek direction in an error-recovery process for the error which occurred in the seek in which the head moved to the target radial position.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
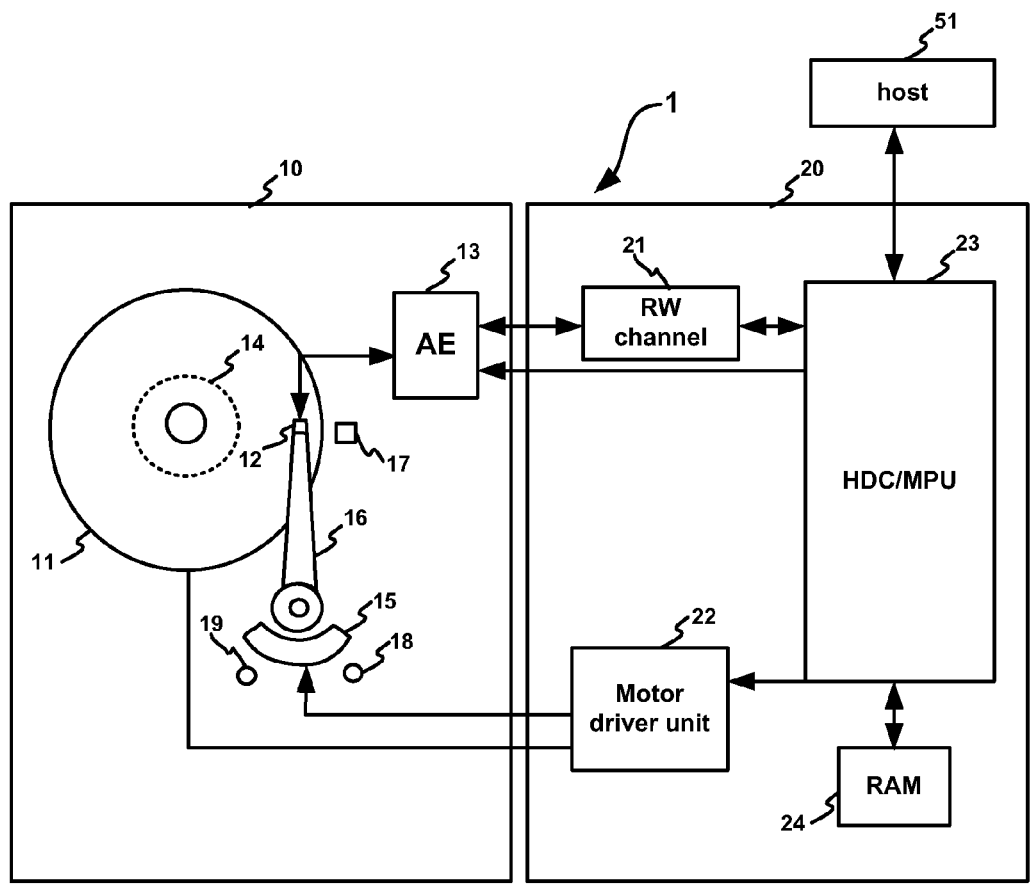
FIG. 1 is a block diagram schematically showing the structure of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive and an Error-Recovery Processing Method With relevance to embodiments of the present invention, when a seek error is generated, the hard-disk drive (HDD) cannot accurately control the servo. Therefore, as is known in the art, the head-slider and the actuator are retracted to a safe home position. The home position is on a ramp in a HDD, which includes a ramp; and, the home position is usually the innermost circumferential region in a HDD, which does not include the ramp.

The HDD returns the head-slider from the home position to above the recording surface, and again seeks the target position. However, in the retries of the seek processing, the seek error is repeatedly generated in the same defective region in the servo data. When the defective region in the servo data expands widely in the circumferential direction and the radial direction, the probability of repeated failure increases.

A technique is known in the art that avoids the generation of seek errors by storing the defective sectors and conducting seeks which avoid the defective sectors. However, when the defective region in the servo data spreads in the circumferential direction and the radial direction, the seek process is difficult to perform so that all of the defective servo sectors are avoided. Thus, implementation of the known technique may utilize extremely complex seek control.

Embodiments of the present invention provide a technique that can prevent seek errors from occurring repeatedly in the defective region in the servo data by using a simple process.

A disk drive, in one embodiment of the present invention, includes a head for accessing a disk configured to store data, a motion mechanism for moving the head, and a controller for determining the seek direction for the error in the error-recovery processing for the error which occurred as the head moved to the target radial position and repeating the seek to the target radial position from the direction opposite to that seek direction. Thus, in accordance with embodiments of the present invention, the error-recovery rate from the seek error can be increased.

In one embodiment of the present invention, the controller conducts a seek to a temporary target radial position before the seek is repeated to the target radial position. As used herein, the term of art, "repeat seek," is a seek from the temporary target radial position to the target radial position. Thus, in accordance with embodiments of the present invention, the error-recovery rate can be increased by an efficient process.

In another embodiment of the present invention, the refraction position where the head is retracted to when handling errors during a seek is fixed. The controller seeks from the retraction position to the temporary target radial position when the direction from the retraction position to the target radial position is the same as the seek direction when the error occurred. The temporary target radial position is further away than the target radial position when viewed from the retraction position. The repeat seek is a seek from the temporary target radial position to the target radial position. Thus, in accordance with embodiments of the present invention, the error-recovery rate from seek errors can be increased in a disk drive with one designated retraction position. Furthermore, the controller, in an embodiment of the present invention, may operate the motion mechanism by a different control than servo control for the retraction to the retraction position. Thus, in accordance with embodiments of the present invention, the generation of errors during refraction can be suppressed. Furthermore, the controller, in an embodiment of the present invention, is applied to a member for restricting the movement of the motion mechanism to the inner circumferential side during retraction of the head to the retraction position. Thus, in accordance with embodiments of the present invention, the processing time for retraction can be shortened.

In another embodiment of the present invention, the controller determines the retraction position of the head depending on the seek direction when an error occurred. The direction from the determined retraction position to the target radial position is the direction opposite to the seek direction. Thus, in accordance with embodiments of the present invention, by selecting the retraction position in this way, the repeat seek is in the direction opposite to the seek direction when the error occurred. Furthermore, the motion mechanism, in an embodiment of the present invention, moves the head to the retraction position by a different control than servo control. Thus, in accordance with embodiments of the present invention, errors during retraction can be suppressed. After refraction, in an embodiment of the present invention, the controller makes the head seek the initial radial position above the disk, and repeats the seek in the direction opposite to the seek direction from the initial radial position to the target radial position. Thus, in accordance with embodiments of the present invention, reliability can be increased.

Another embodiment of the present invention is an error-recovery method in a disk drive which includes a head for accessing the disk and a motion mechanism for moving the head. This method seeks by moving the head to the target radial position, and includes the following operations. An error-recovery process starts for an error which occurred during the seek. The seek direction during an error is determined. The seek is repeated from the direction opposite to the seek direction to the target radial position. Thus, in accordance with embodiments of the present invention, the error-recovery rate from a seek error can be increased.

For embodiments of the present invention described below, a HDD is described by way of example of a disk drive, without limitation thereto, as other types of disk drive different from a HDD are also within the spirit and scope of embodiments of the present invention.

In accordance with embodiments of the present invention, the HDD includes an error-recovery process for seek errors. When a seek error is generated, the HDD conducts the error-recovery process. In the seek errors recovery process, the HDD executes the error-recovery process depending on the seek direction of the seek that caused the error. Specifically, the HDD repeats the seek to the target radial position, at which a target data track is located, in the direction opposite to the seek which caused the error. Thus, the seek can be repeated, as a so called "repeat seek," to the target radial position while avoiding the defective region in the servo data; and, repeated generation of a seek error in the defective region in the servo data can be avoided.

With reference now to FIG. 1, in accordance with embodiments of the present invention, a block diagram is shown of a HDD 1 that includes a circuit board 20 secured to the outside of a disk enclosure (DE) 10. The circuits of a read/write channel (RW channel) 21, a motor-driver unit 22, an integrated circuit, which is a hard-disk controller/microprocessor unit (HDC/MPU) 23, and a semiconductor random-access memory (RAM) 24 are on the circuit board 20.

In DE 10, a spindle motor (SPM) 14 rotates a magnetic-recording disk 11 at a designated angular velocity. The magnetic-recording disk 11 is a disk for storing data. A head-slider 12, which is an example of a head used in a disk drive, includes a slider, which flies above the magnetic-recording disk 11, and a magnetic-recording head, which is formed on the slider and converts a magnetic signal from the magnetic-recording disk 11 to an electrical signal, and an electrical signal to the magnetic-recording head to a magnetic signal for the magnetic-recording disk 11; the magnetic-recording head also accesses the magnetic-recording disk 11. As used herein, "access" is a term of art that refers to operations in seeking a data track of a magnetic-recording disk and positioning a magnetic-recording head on the data track for both reading data from, and writing data to, the magnetic-recording disk 11. One or a plurality of head-sliders 12 is secured to the distal end of an actuator 16. The actuator 16, which is the motion mechanism of the head-slider 12, is connected to a voice-coil motor (VCM) 15 and moves the head-slider 12 in the radial direction above the rotating magnetic-recording disk 11 by oscillating about a pivot shaft at the center of the actuator 16. The actuator 16 and the VCM 15 are an example of the motion mechanism of the head-slider 12.

HDD 1 in FIG. 1 includes a load/unload ramp 17. When the rotation of the magnetic-recording disk 11 stops and proceeds to an immobile state, the actuator 16, which is attached to the head-slider 12, above the recording surface of the magnetic-recording disk 11 is retracted to a load/unload ramp 17. The refracted actuator 16 rests on the load/unload ramp 17 positioned close to the magnetic-recording disk 11. This resting position is called the waiting position. The head-slider 12 is on the outside of the magnetic-recording disk 11.

A crash stop 18 on the inner circumferential side and a crash stop 19 on the outer circumferential side, which define the oscillation range, which is the motion range, of the actuator 16, are disposed in the disk enclosure (DE) 10. The crash stop 18 on the inner circumferential side is stipulated to move toward the inner circumferential side of the actuator 16. The actuator 16 can rotate in the outer circumferential direction until the position that bumps against the crash stop 19 on the outer circumferential side.

The process for moving the head-slider 12, which is attached to the actuator 16, to the waiting position on the load/unload ramp 17 from above the magnetic-recording disk 11 is referred to as unload. The process for moving the actuator 16 from the load/unload ramp 17 to above the recording surface of the magnetic-recording disk 11 is referred to as a "load." The present invention can also be applied to a HDD employing the contact-start-and-stop (CSS) method in which the waiting position is in a specific region of the magnetic-recording disk 11. As described herein, the process for moving the actuator 16 to a waiting position unrelated to the waiting position of the actuator 16, which is attached to the head-slider 12, is referred to as an "unload." The operation for moving the actuator 16 from the waiting position to above the data region of the magnetic-recording disk 11 is also referred to as a "load."

The motor-driver unit 22 drives the SPM 14 and the VCM 15 in response to control data from HDC/MPU 23. An arm electronic (AE) module 13 selects a head-slider 12 for accessing the magnetic-recording disk 11 from a plurality of head-sliders 12 in accordance with the control data from HDC/MPU 23, and amplifies the read-back signal and the write signal. The RW channel 21 extracts and decodes servo data and user data from the read-back signal acquired from the AE module 13 in the read process. The decoded data are sent to HDC/MPU 23. In the write process, the RW channel 21 code modulates the write data sent from HDC/MPU 23, converts the code-modulated data into a write signal, and transmits the write signal to the AE module 13.

In HDC/MPU 23, the HDC is a logic circuit, and the MPU operates in accordance with firmware loaded in the RAM 24. Upon starting HDD 1, the data for control and data processing are loaded into the RAM 24 from the magnetic-recording disk 11 or a ROM (not shown). HDC/MPU 23 is an example of the controller and executes control of HDD 1 such as processing related to head position control, interface control, and data processing such as defect management. Particularly, in this embodiment of the present invention, an operation of HDC/MPU 23 is processing for seek errors.

Figure 2:
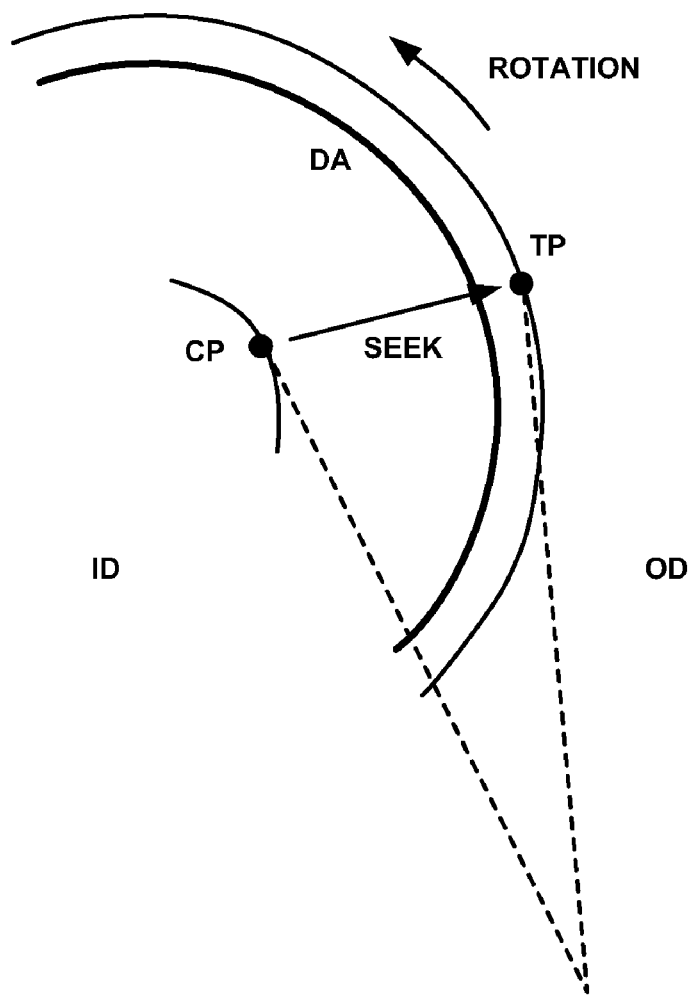
FIG. 2 is a schematic view showing the motion of the head-slider during a seek which passes above a defective region in the servo data, in accordance with an embodiment of the present invention.

A seek error is an error generated in the seek process. The seek operation is a process for moving the head-slider 12, which is attached to the actuator 16, which follows the current radial position toward the target radial position, which differs from the current radial position, which is a seek-start radial position. In the schematic diagram in FIG. 2, the head-slider 12 follows the seek-start radial position SP, which is normally located at the current data track. The head-slider 12 starts the seek process, and starts moving toward the outer circumferential side of the magnetic-recording disk 11 from the seek-start radial position SP and moves to the target radial position TP, which is normally located at the target data track.

The seek process ends when the head-slider 12 can normally follow the target radial position TP. HDC/MPU 23 transitions follow. The condition for the end of the seek depends on the design of HDD 1. One example of the condition can be positioning the head-slider 12 in the designated range from the target radial position TP. Another example is when the rate of change of the position error from the target radial position TP of the head-slider 12 is within the designated range.

The seek process is executed under servo control by HDC/MPU 23. Specifically, HDC/MPU 23 uses servo data read by the head-slider 12 while moving to control the actuator 16 through VCM 15. Consequently, if a defective region DA exists in the servo data between the seek-start radial position SP and the target radial position TP of the head-slider 12, the servo data at that position cannot be read normally, and a seek error occurs. For example, when HDC/MPU 23 could not accurately read a large number of consecutive servo sectors above a designated number, which includes when the servo sector cannot be found, and when the data in the read servo sectors contain errors, HDC/MPU 23 determines that a seek error occurred.

When a seek error occurs, HDC/MPU 23 starts the seek error-recovery process. HDC/MPU 23 refers to the seek error-recovery process table set and registered in HDD 1, and sequentially executes each error-recovery processing operation. The seek error-recovery process table in this embodiment of the present invention includes an operation for recovery processing depending on the seek direction of the seek operation which caused the error. Specifically, HDC/MPU 23 seeks the target radial position in a direction opposite to the seek direction when the error occurred. Thus, the defective region in the servo data which caused the seek error can be avoided; the head-slider 12 can be moved to the target radial position; and repeating the seek error in the defective region in the servo data can be avoided.

After a seek error occurs, in accordance with embodiments of the present invention, a plurality of different process flows exists to repeat the seek to the target radial position in the opposite direction. Each process passes the head-slider 12 above the data defective region and the target radial position, and moves the head-slider 12 to the side opposite the seek-start position to sandwich the target radial position. Then, the head-slider 12 moves, seeks, the target radial position from the side opposite the previous seek-start radial position, and the defective region in the servo data.

A processing example is described in which HDC/MPU 23 first moves the actuator 16 to the crash stop 18 on the inner circumferential side of the magnetic-recording disk 11 when a seek error occurred, and then starts the repeat seek toward the target radial position. The actuator 16 presses against the crash stop 18 on the inner circumferential side and prevents the actuator 16 from running out of control, and the reliability of HDD 1 can be increased. In addition, compared to unloading onto the load/unload ramp 17, the processing time until the repeat seek can be shortened.

When the actuator 16 hits the crash stop 18 on the inner circumferential side, the head-slider 12 is at the innermost circumferential position. Consequently, the head-slider 12 is positioned on the inner circumferential side with respect to any target radial position. When a seek which caused an error was a seek from the outer circumferential side to the inner circumferential side, the defective region in the servo data is on the side opposite the current radial position of the head-slider 12 as the target radial position. Consequently, even for a seek from the inner circumferential side to the target radial position, the head-slider 12 does not pass above the defective region in the servo data. Conversely, when the seek which caused an error is a seek from the inner circumferential side to the outer circumferential side, the head-slider 12 passes above the defective region in the servo data.

Figure 3:
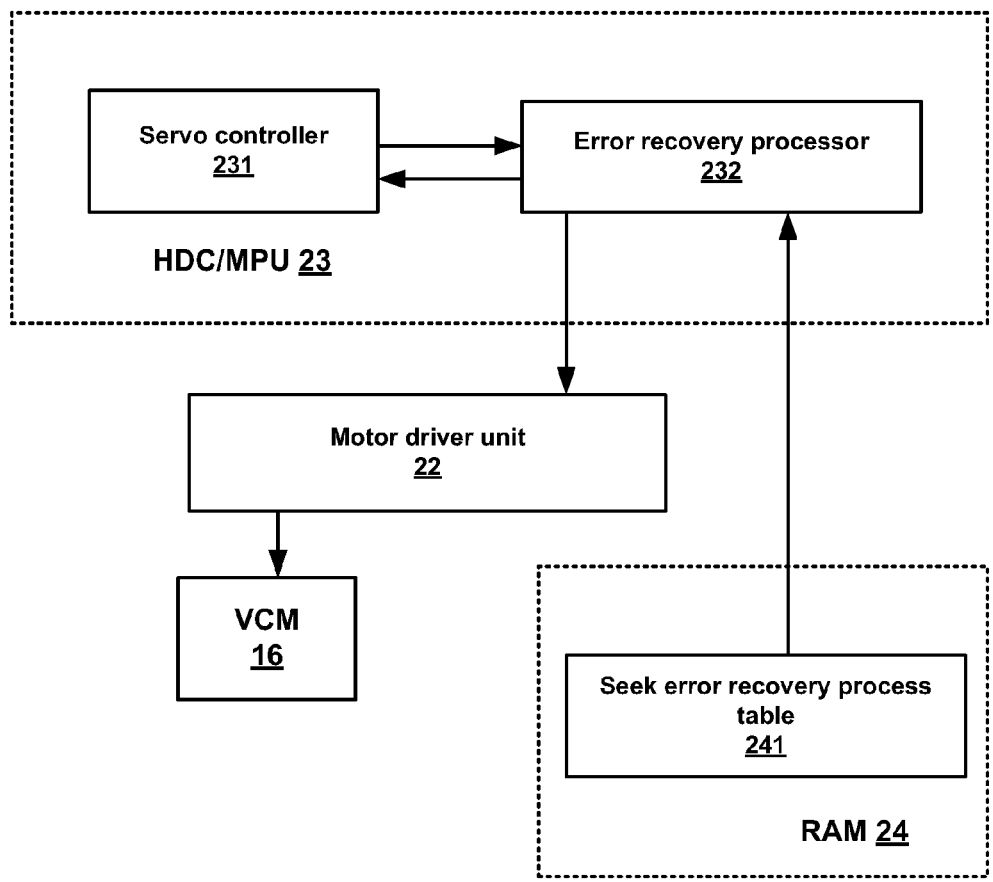
FIG. 3 is block diagram schematically showing the structure in this embodiment for processing a repeat seek to the target radial position after the actuator was retracted to a crash stop on the inner circumferential side when a seek error occurred, in accordance with an embodiment of the present invention.

Therefore, HDC/MPU 23 determines subsequent processing depending on the direction of the seek which caused an error. FIG. 3 is a block diagram schematically showing the structural elements related to this process. HDC/MPU 23 functions as a servo controller 231 and as an error-recovery processor 232. As shown in the flow chart in FIG. 4, at S11, an error, which is a seek error, is generated when the servo controller 231 performs the seek process; then the error-recovery processor 232 receives notification from the servo controller 231 and commands the motor-driver unit 22 to move the actuator 16 to the crash stop 18 on the inner circumferential side.

At S12, the motor-driver unit 22 drives the VCM 15 and moves the actuator 16 to the crash stop 18 on the inner circumferential side. This motion directly drives the VCM 15 without depending on servo control which uses servo data on the magnetic-recording disk 11. In an embodiment of the present invention, this is a constant voltage drive. Then, the error-recovery processor 232 directs the servo controller 231 to seek the specified initial radial position. The servo controller 231 slowly moves the actuator 16 to the outer circumferential side via the motor-driver unit 22. In accordance with an embodiment of the present invention, this motion is a direct drive of the VCM 15, which may be performed through servo control using the VCM back electromotive force (emf), voltage, and which differs from servo control using the servo data on the magnetic-recording disk 11.

When the head-slider 12 reaches the position where the servo data can be accurately read, the servo controller 231 transitions to servo control. Then, at S13, the servo controller 231 positions the head-slider 12, which is attached to the actuator 16, in other words, follows the track, at the initial radial position described above. The servo controller 231 notifies the error-recovery processor 232 of the completion of the seek to the initial radial position.

The error-recovery processor 232 refers to a seek error-recovery process table 241 stored in the RAM 24 and executes the error-recovery processing operation. In this operation, at S14, the error-recovery processor 232 determines the seek direction of the seek operation which caused an error. When the seek direction is from the outer circumferential side to the inner circumferential side, which is from the outside to the inside at S14, the error-recovery processor 232 starts a seek from the initial radial position to the target radial position, at S15. When the error seek direction is from the inner circumferential side to the outer circumferential side, which is from the inside to the outside at S14, after the seek, at S16, to the temporary target radial position, which is closer to the outer circumferential side than the original target radial position, the seek to the original target radial position is conducted. The temporary target radial position is further away than the original temporary target radial position when viewed from the inner circumferential side.

Figure 5:
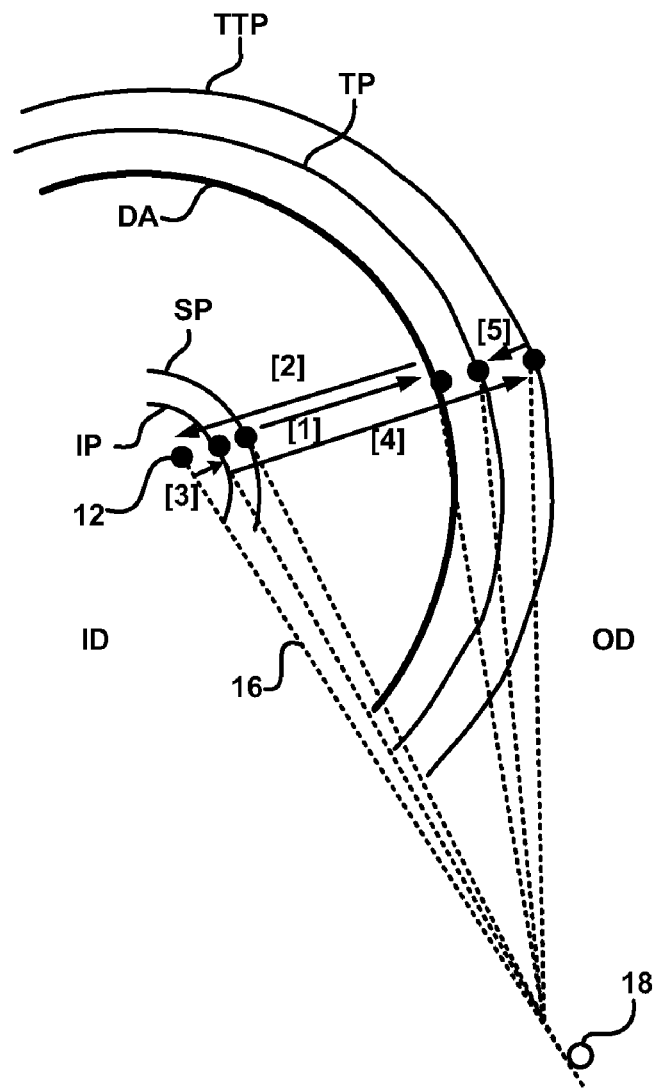
FIG. 5 is a schematic view showing the motion of the head-slider when seeking the original target radial position after seeking the temporary target radial position in the process in FIG. 4, in accordance with an embodiment of the present invention.

In accordance with embodiments of the present invention, the process including operation, S16, is described with reference to the schematic view in FIG. 5. FIG. 5 schematically shows the motions of the actuator 16 and the head-slider 12 in this process. In FIG. 5, the head-slider 12 moves toward the target radial position TP from the seek-start position SP, indicated by arrow [1]. At S11, a seek error is generated above the defective region DA in the servo data; and, at S12, the head-slider 12 moves to the innermost circumferential position, indicated by arrow [2]. The actuator 16 presses against the crash stop on the inner circumferential side. Then, at S13, the head-slider 12 moves to the initial radial position, indicated by arrow [3].

At S16, the error-recovery processor 232 commands the servo controller 231 to seek the temporary target radial position TTP on the outside from the original target radial position TP; and, after the seek ends, commands a seek from the temporary target radial position TTP to the original target radial position TP. The error-recovery processor 232 can always use the same temporary target radial position unrelated to the original target radial position.

In an embodiment of the present invention, the temporary target radial position is determined from the original target radial position, which is given by a track address. Usually, the longer seek distance is because other errors are generated. For example, a position separated by only a designated number of servo tracks from the original target radial position is set at the temporary target radial position. The head-slider 12 moves from the initial radial position to the temporary target radial position TTP, indicated by arrow [4]. Then, the head-slider 12 moves from the temporary target radial position TTP to the original target radial position TP, indicated by arrow [5].

The direction of seek, which is the repeat seek to the target radial position TP, from the temporary target radial position TTP to the original target radial position TP is the reverse of the direction of the seek, indicated by arrow [1], which caused the error. In the seek, indicated by arrow [5], the head-slider 12 does not pass above the defective region DA in the servo data, and the seek error is not repeated. In addition, in the seek, indicated by arrow [4], from the initial radial position to the temporary target radial position TTP, the head-slider 12 passes over the defective region DA in the servo data.

A seek error in the defective region DA in the servo data depends on the seek velocity. When the seek velocity is slow above the defective region DA in the servo data, the probability of a seek error increases. When the seek velocity is fast, the probability of a seek error decreases. The seek velocity becomes faster as the seek-start position is further away, and slower when closer to the target radial position. Generally, the seek velocity maintains a constant value after the head-slider 12 accelerates from the seek-start position, then the seek velocity decreases as the head-slider 12 decelerates.

When the defective region DA in the servo data and the target radial position are close, the head-slider 12 passes at a slow velocity above the defective region DA in the servo data. By setting the target radial position at a position far from the defective region DA in the servo data, the seek velocity above the defective region DA in the servo data is faster, and the probability of a seek error can be reduced.

In one embodiment of the present invention, the initial radial position is located further towards the inner circumferential side of the magnetic-recording disk 11 than the defective region DA in the servo data. In the above process, the initial radial position is always the same position. In another embodiment of the present invention, the range for transitioning to servo control is on the inner circumferential side as much as possible. For example, the tracks in the inner circumferential region, which is not used to store user data, can be used as the initial radial position. If this design is possible, the error-recovery processor 232 can change the initial radial position depending on the condition. For example, when the seek direction during a seek error is directed from the outer circumference to the inner circumference, the error-recovery processor 232 can set the original target radial position at the initial radial position. This is a repeat seek so that the seek toward the target radial position does not pass through the initial radial position.

The above process presses the actuator 16 against the crash stop 18 on the inner circumferential side in response to a seek error. However, the error-recovery processor 232 may unload the actuator 16 onto the load/unload ramp 17 in response to a seek error. The direction of motion of the head-slider 12, which is attached to the actuator 16, during this process is the reverse of the process for retraction to the crash stop 18 on the inner circumferential side.

Specifically, this process loads the actuator 16 after unloading onto the load/unload ramp 17. Then, a seek is conducted from the initial radial position on the outer circumferential side to the original target radial position depending on the seek direction when the seek error occurred. Alternately, after a seek to the temporary target radial position which is further on the inner circumferential side than the original target radial position, a seek is conducted to the original target radial position. The concept of the initial radial position is similar to that when retracting to the crash stop 18 on the inner circumferential side. The temporary target radial position is further away than the original target radial position when viewed from the load/unload ramp 17.

If possible in the design, the retraction position of the head-slider 12 for a seek error may be the specified radial position of the magnetic-recording disk 11. The designated initial radial position becomes the retraction position. The error-recovery processor 232 moves the actuator 16 by direct drive of the VCM 15 immediately after a seek error. When the head-slider 12 accurately reads the servo data, as in a servo lock, the head-slider 12 moves to the specified radial position, which is located at the servo track, under servo control. However, from the perspective of safety, the actuator 16 is refracted to the crash stop 18 on the inner circumferential side or the load/unload ramp 17, in one embodiment of the present invention.

Figure 6:
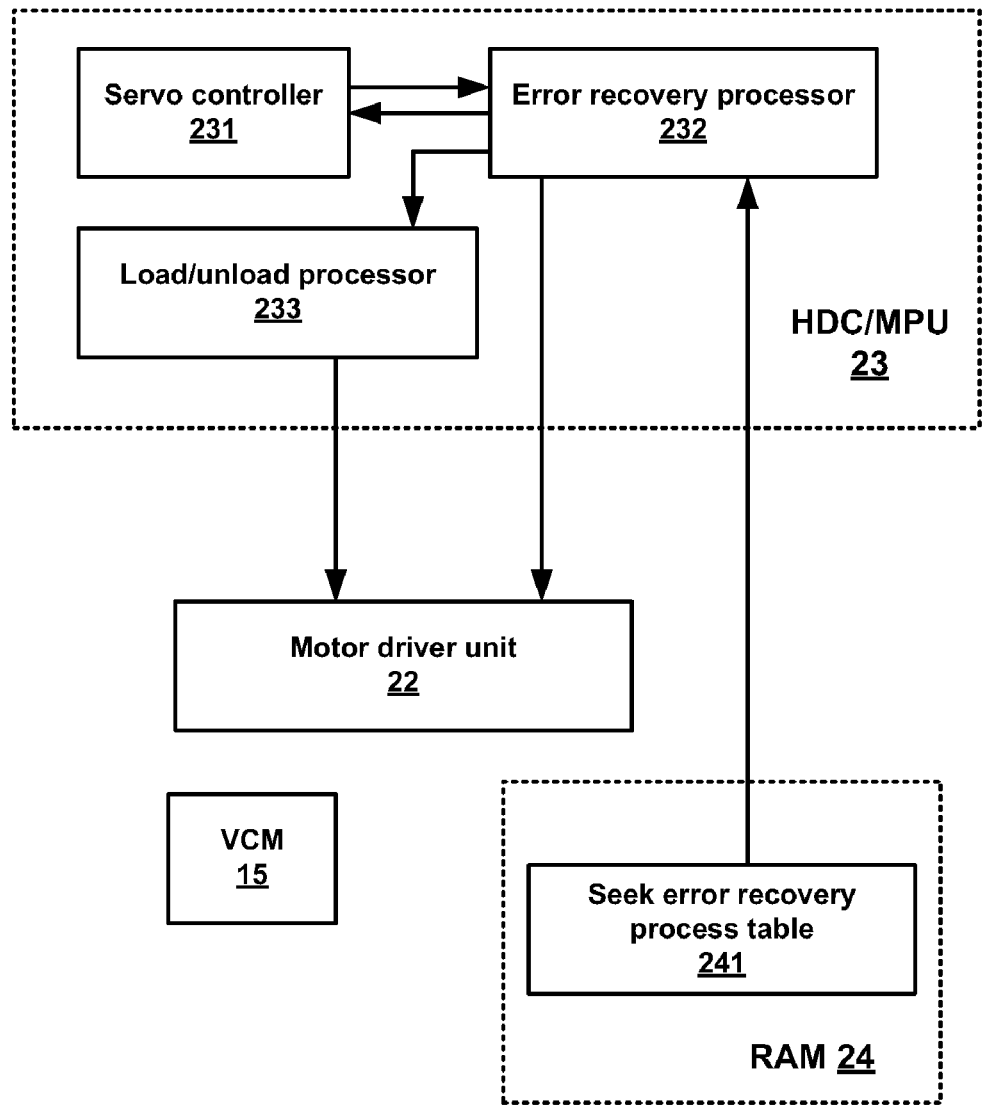
FIG. 6 is a block diagram schematically showing the structure in which a process is conducted to retract the actuator to a different position depending on the seek direction when a seek error occurred, and then repeats the seek to the target radial position, in accordance with an embodiment of the present invention.
Figure 7:
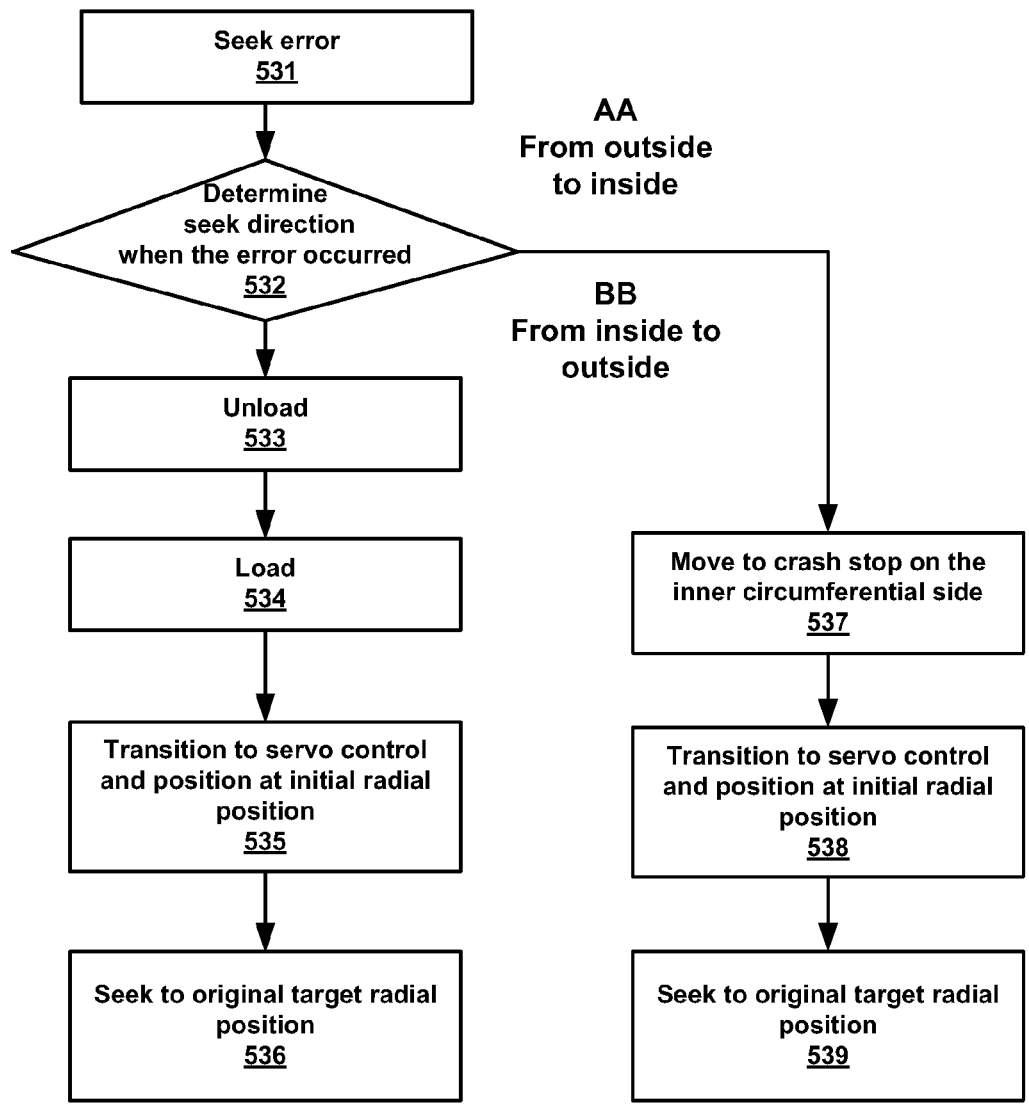
FIG. 7 is a flow chart of the process in which the actuator is retracted to a different position depending on the seek direction when a seek error occurred, and the seek is repeated to the target radial position, in accordance with an embodiment of the present invention.

Next, the process is described in which the error-recovery processor 232 changes the direction of retraction of the actuator 16 depending on the seek direction when a seek error occurred. FIG. 6 is a block diagram schematically showing the structural elements related to this process. HDC/MPU 23 functions as the servo controller 231, the error-recovery processor 232, and the load/unload processor 233. The process flow is described with reference to the flow chart in FIG. 7.

At S31, when a seek error is generated in a seek from the seek-start position to the target radial position, the error-recovery processor 232 receives notification from the servo controller 231, and starts processing in accordance with the seek error-recovery process table 241. At S32, the error-recovery processor 232 determines the seek direction during the seek error. When the seek direction is from the inner circumferential side to the outer circumferential side, which is from the inside to the outside at S32, the error-recovery processor 232 commands the load/unload processor 233 to unload the actuator 16, which is attached to the head-slider 12. The load/unload processor 233 controls the motor-driver unit 22; and, at S33, the actuator 16 is moved onto the load/unload ramp 17, which is an unload. The unloading does not depend on servo control which uses servo data above the magnetic-recording disk 11, and the VCM 15 is driven directly. Specifically, the servo control uses the VCM back-emf, which is a voltage.

Then, the error-recovery processor 232 commands the load/unload processor 233 to load the actuator 16, which is attached to the head-slider 12. The load/unload processor 233 controls the motor-driver unit 22; and, at S34, the actuator 16 is moved from the load/unload ramp 17 to the magnetic-recording disk 11, which is a load. When the head-slider 12 reaches the position where the servo data is accurately read, the error-recovery processor 232 is notified of the end of loading. At S35, the servo controller 231 positions the head-slider 12 at the specified initial radial position, in other words, follows the track, in accordance with commands from the error-recovery processor 232.

Then, the error-recovery processor 232 specifies the original target radial position and commands the servo controller 231 to start the seek. The servo controller 231 seeks from the initial radial position on the outer circumferential side to the target radial position on the inner circumferential side, at S36. Because the defective region in the servo data is on the inner circumferential side of the target radial position, in the repeat seek, which is under servo control, after retraction to the load/unload ramp 17 on the outer circumferential side, the head-slider 12 can move to the original target radial position without passing above the defective region in the servo data.

When the seek direction of a seek which caused an error is from the outer circumferential side to the inner circumferential side, which is from the outside to the inside at S32, the error-recovery processor 232 commands the motor-driver unit 22 to move the actuator 16 to the crash stop 18 on the inner circumferential side. The motor-driver unit 22 drives the VCM 15; and, at S37, the actuator 16 moves to the crash stop 18 on the inner circumferential side. This motion does not depend on servo control using servo data above the magnetic-recording disk 11 and, in one embodiment of the present invention, is a constant voltage drive.

The error-recovery processor 232 commands the servo controller 231 to seek to the specified initial radial position. The servo controller 231 slowly moves the actuator 16 to the outer circumferential side via the motor-driver unit 22. In an embodiment of the present invention, this motion is the direct drive of the VCM 15, which may be performed through servo control using the VCM back-emf, which is a voltage, and which differs from servo control using the servo data above the magnetic-recording disk 11.

When the head-slider 12 reaches a position where the servo data can be accurately read, the servo controller 231 transitions to servo control. Then, at S38, the servo controller 231 positions the head-slider 12, which is attached to the actuator 16, at the initial radial position, in other words, follows the track. The servo controller 231 notifies the error-recovery processor 232 of the end of the seek to the initial radial position.

The error-recovery processor 232 specifies the original target radial position to the servo controller 231, and commands starting the seek. The servo controller 231 seeks from the initial radial position on the inner circumferential side to the target radial position on the outer circumferential side (S39). Because the defective region in the servo data exists on the outer circumferential side of the target radial position, by retracting to the crash stop 18 on the inner circumferential side, the head-slider 12 does not pass above the defective region DA in the servo data in the subsequent repeat seek and can move to the original target radial position.

Figure 8:
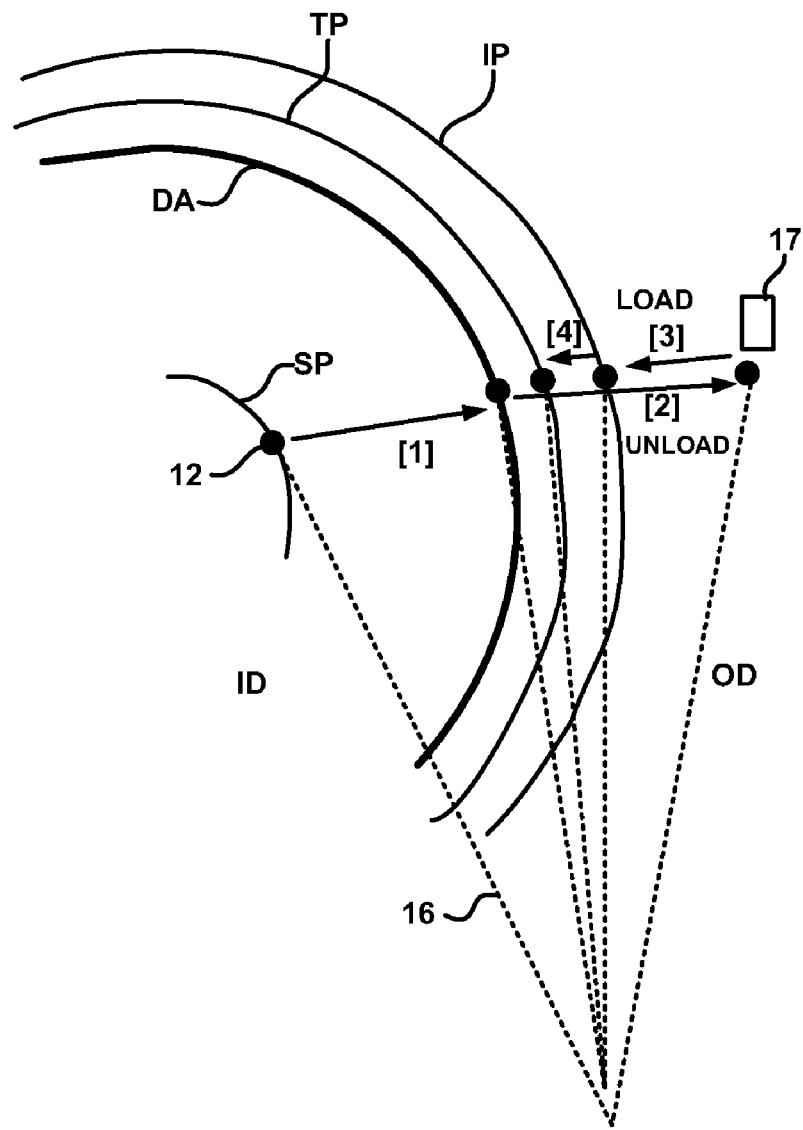
FIG. 8 is a schematic view showing the motion of the head-slider in the process for handling an error which occurred during the seek from the inner circumferential side to the outer circumferential side in the process in FIG. 6, in accordance with an embodiment of the present invention.

In accordance with embodiments of the present invention, a processing example of a seek error during a seek from the inner circumferential side to the outer circumferential side is described with reference to the schematic view in FIG. 8. FIG. 8 schematically shows the operation of the head-slider 12, which is attached to the actuator 16, in this example. The head-slider 12 moves, in other words, seeks, from the seek-start radial position SP toward the target radial position TP; and, at S31, a seek error is generated in the defective region DA in the servo data, indicated by arrow [1]. The actuator 16, which is attached to the head-slider 12, moves further in the same direction as the seek, which caused the error, and, at S33, moves to the load/unload ramp 17, indicated by arrow [2].

Then, at S34, the actuator 16 moves to above the magnetic-recording disk 11 from the load/unload ramp 17, which is a load; and, at S35, the head-slider 12 is positioned at the initial radial position IP, indicated by arrow [3]. Furthermore, at S36, the head-slider 12 moves, in other words, seeks, from the initial radial position IP to the target radial position TP, indicated by arrow [4]. When the head-slider 12 passes above the defective region DA in the servo data, the servo control is canceled. The repetition of the seek error can be avoided because the head-slider 12 does not pass above the defective region DA in the servo data in the repeat seek to the target radial position.

Figure 4:
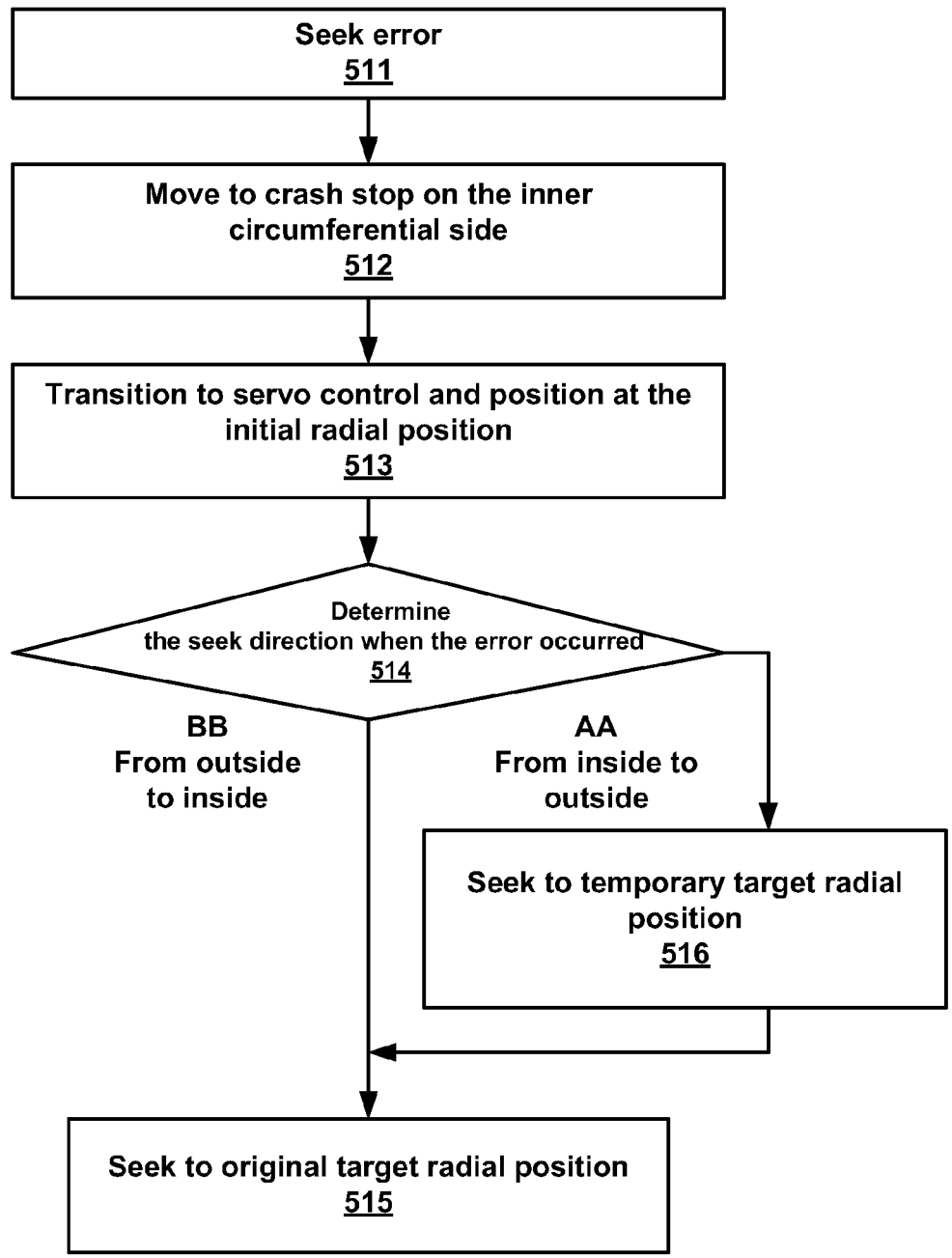
FIG. 4 is a flow chart of the process for repeating the seek to the target radial position after the actuator was retracted to the crash stop on the inner circumferential side when a seek error occurred, in accordance with an embodiment of the present invention.

The retraction position and the initial radial position when the seek error occurred can be similarly described for the structure described with reference to FIGS. 3 to 5. If possible in the design, the error-recovery processor 232 can retract the head-slider 12 to the load/unload ramp 17, or the specified servo track, above the disk which differs from the crash stop 18 on the inner circumferential side. The error-recovery processor 232 selects the retraction position based on the seek direction during a seek error. In addition, if the initial radial position can be changed, the error-recovery processor 232 can change the initial radial position depending on the target radial position. For example, the target radial position coincides with the initial radial position.

As set forth above, embodiments of the present invention have been described by way of examples; but, embodiments of the present invention are not limited to the above-described examples, as embodiments of the present invention can, of course, be modified, added to, and/or elements of the examples converted in various ways within the spirit and scope of embodiments of the present invention. For example, one or both of a process for setting the temporary target radial position depending on the seek direction when an error occurred, and a process for changing the retraction position depending on the seek direction when an error occurred can be implemented in a HDD. By implementing both, the probability of error recovery can be increased.

Embodiments of the present invention can be applied to a HDD which does not use a seek error-recovery process table. In one embodiment of the present invention, the process is performed immediately after a seek error; but, embodiments of the present invention are not limited to this. In addition to HDDs, embodiments of the present invention can be applied to disk drives using other types of disks, besides magnetic-recording disks, such as optical disks or magneto-optical disks, or disk drives capable of mounting to, and dismounting from, those disks. Moreover, embodiments of the present invention can be applied to disk drives having a motion mechanism for moving the head by sliding. Furthermore, embodiments of the present invention can be applied to disk drives not having a data write function.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive, comprising:
   a head for accessing a disk configured to store data,
   a motion mechanism for moving said head, and
   a controller for determining a seek direction when an error occurred, and for repeating a seek as a repeat seek to a target radial position from a direction opposite to said seek direction in an error-recovery process for said error which occurred in said seek in which said head moved to said target radial position, wherein a retraction position where said head is retracted in response to said error during said seek is fixed and wherein said controller seeks from said retraction position to a temporary target radial position when a direction from said retraction position to said target radial position is a same direction as said seek when said error occurred.

2. The disk drive of claim 1, wherein said controller seeks a temporary target radial position before repeating said seek as said repeat seek to said target radial position, and
   said repeat seek is a seek from said temporary target radial position to said target radial position.

3. The disk drive of claim 1, further comprising:
   said temporary target radial position is further away than said target radial position when viewed from said retraction position; and
   said repeat seek is a seek from said temporary target radial position to said target radial position.

4. The disk drive of claim 3, wherein said controller operates said motion mechanism by a control different than servo control when retracting to said retraction position.

5. The disk drive of claim 4, wherein said controller hits a member for controlling a motion of said motion mechanism to an inner circumferential side when retracting said head to said retraction position.

6. The disk drive of claim 1, wherein said controller determines a retraction position of said head depending on said seek direction when said error occurred; and
   a direction from said retraction position which was determined to said target radial position is said direction opposite to said seek direction.

7. The disk drive of claim 6, wherein said motion mechanism moves said head to said retraction position by using a control different than servo control.

8. The disk drive of claim 6, wherein said controller seeks said head to an initial radial position above said disk after a retraction; and
   said repeat seek is in said direction opposite to said seek direction from said initial radial position to said target radial position.

9. An error-recovery method in a disk drive having a head for accessing a disk and a motion mechanism for moving said head, wherein said disk drive has moved said head in a seek to a target radial position, said method comprising:
   starting an error-recovery process for an error, which occurred during said seek;
   determining a seek direction when said error occurred; and
   repeating said seek as a repeat seek from a direction opposite to said seek direction to said target radial position wherein a retraction position where said head is retracted in response to an error during said seek is fixed and a seek is conducted from said retraction position to a temporary target radial position when a direction from said retraction position to said target radial position is same as said seek direction when said error occurred.

10. The method of claim 9, wherein a seek to a temporary target radial position is conducted before a repeat seek to said target radial position; and
    said repeat seek is a seek from said temporary target radial position to said target radial position.

11. The method of claim 9, further comprising:
    said temporary target radial position is further away than said target radial position when viewed from said retraction position; and
    said repeat seek is a seek from said temporary target radial position to said target radial position.

12. The method of claim 11, wherein said motion mechanism is operated by a control different than servo control in a retraction to said retraction position.

13. The method of claim 12, wherein said controller hits a member for defining a motion of said motion mechanism to an inner circumferential side during a retraction of said head to said retraction position.

14. The method of claim 9, wherein a retraction position of said head is determined depending on said seek direction when said error occurred; and
    a direction from said retraction position which was determined toward said target radial position is said direction opposite to said seek direction.

15. The method of claim 14, wherein said head moves to said retraction position by a control different than servo control.

16. The method of claim 14, wherein a seek of said head is conducted to an initial radial position above said disk after a retraction; and
    said repeat seek is conducted in a direction opposite to a seek direction from said initial radial position to said target radial position.

* * * * *